United States Patent [19]

Sheyon

[11] 4,230,753

[45] Oct. 28, 1980

[54] PRESSURE SENSITIVE COMPOSITE ARTICLE

[75] Inventor: Gregory M. Sheyon, Anderson, S.C.

[73] Assignee: Stauffer Chemical Company, Westport, Conn.

[21] Appl. No.: 922,718

[22] Filed: Jul. 7, 1978

[51] Int. Cl.$^2$ .............................................. B29C 3/00
[52] U.S. Cl. ..................................... 428/40; 428/212; 428/215; 428/218; 428/286; 428/315; 428/343; 428/352; 428/355
[58] Field of Search ................. 428/40, 352, 224, 340, 428/212, 215, 218, 286, 315, 343, 355, 515, 520, 522; 296/31 R, 31 P, 137 R

[56] References Cited

U.S. PATENT DOCUMENTS

| | | | |
|---|---|---|---|
| 2,057,873 | 10/1936 | Atwood | 428/40 |
| 3,572,798 | 3/1971 | Kunevicius | 428/40 X |
| 3,846,200 | 11/1974 | Doerfling | 156/85 |
| 3,900,644 | 8/1975 | Sackoff et al. | 428/40 |
| 3,988,519 | 10/1976 | Stoller | 428/224 X |

Primary Examiner—Marion McCamish
Attorney, Agent, or Firm—Richard P. Fennelly

[57] ABSTRACT

A pressure sensitive composite article, which is useful, for example, as an exterior roofing material for a motor vehicle, is disclosed. It comprises a heat bondable plastic film which is attached to a backing material having a substantially continuous coating of a pressure sensitive adhesive on its opposite side thereof, and a polymeric release liner on the exposed side of the adhesive. The release liner has a melting point below the temperature at which the plastic film is permanently heat deformable.

16 Claims, 4 Drawing Figures

PRESSURE SENSITIVE COMPOSITE ARTICLE

BACKGROUND OF THE INVENTION

1. Field of the Invention

The present invention is a pressure sensitive composite article which is suitable, for example, as an exterior roof covering for a motor vehicle.

2. Description of the Prior Art

Plastic film/backing laminates which are suitable, for example, as an exterior roof material for a motor vehicle are known. It has been commonplace for such laminates to be attached to the vehicle roof by means of a solvent based adhesive which is sprayed on the backing and/or vehicle roof or by means of a heat activatable adhesive (see U.S. Pat. Nos. 3,846,200 and 3,935,353 to R. G. Doerfling et al.). In applicant's copending U.S. Application Ser. No. 827,755, filed Aug. 25, 1977, now abandoned an improved plastic film/backing laminate is described wherein the backing has a substantially continuous and uniform layer of a pressure sensitive adhesive bonded to the side of the backing which is opposite the plastic film. In order to prevent contamination of the exposed surface of the pressure sensitive adhesive layer, a suitable release liner is preferably bonded to the exposed surface of the adhesive layer. It is taught in that copending application that the release liner is removed from the composite article prior to placing the plastic film/backing/adhesive laminate on the vehicle roof and bonding it thereto.

Often it is desired to combine several small pieces of conventional plastic film/backing laminate into larger unitary pieces. Such an operation allows the use of potential scrap, and other small pieces, and allows for a greater utilization of all the laminate that may be produced. It is conventional to stitch and heat bond such pieces together to form such larger pieces. The resulting product, after being sprayed with a contact type adhesive, can then be used to cover a wider portion of the vehicle roof with a unitary covering. In the case of the laminates shown in pending U.S. Application Ser. No. 827,755, the release liner may be of a non-sealable type so as to preclude heat bonding of separate pieces of the laminate to form a larger unitary article. The invention shown in that patent application shows no appreciation of this heat bonding operation and does not teach how a person of ordinary skill in the art might form a pressure sensitive composite article which could be joined together by stitching and heat bonding to a similar article without the labor intensive act of removal of the release liner in the desired bonding area or areas.

SUMMARY OF THE PRESENT INVENTION

The present invention is a pressure sensitive composite article which comprises a heat bondable plastic film, a backing attached to one side of the film, a substantially continuous coating of a pressure sensitive adhesive on the opposite side of the backing from the film, and a polymeric release liner on the exposed side of the adhesive, said release liner having a melting point below the temperature at which the plastic film is permanently heat deformable.

DESCRIPTION OF PREFERRED EMBODIMENTS OF THE INVENTION

Figure 1:
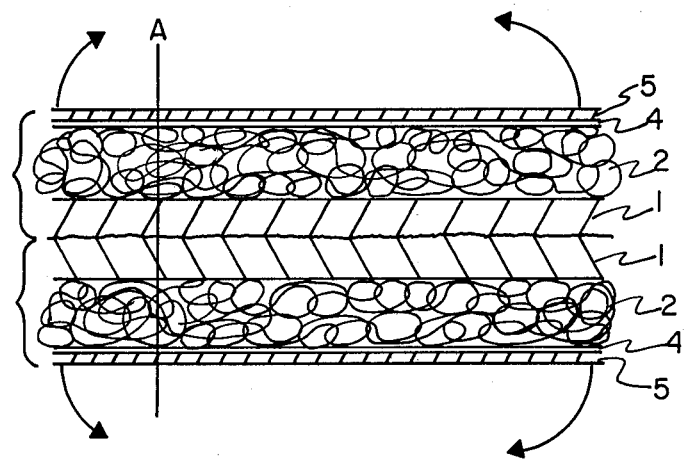
FIG. 1 shows two composite articles of the present invention (each denoted by a bracket) placed back to back and stitched together along line A. The arrows denote the respective direction of rotation of the pieces to bring them into the configuration depicted in FIG. 2.

The composite article of the present invention comprises some elements which are old, namely, plastic film 1 as well as flexible backing 2, which is attached to film 1. A suitable adhesive, e.g., a plastisol adhesive (not shown) can be used to attach plastic film 1 to backing 2, if desired, and this adhesive layer is also sometimes used in film 1/backing 2 articles known to the prior art. Any person of ordinary skill in the art would be able to select appropriate materials for making such a film/backing sub-combination (optionally joined with adhesive) from the description which follows.

The plastic film 1 may be formed by any heat bondable thermoplastic or thermosetting synthetic polymer which, preferably, is resistant to weathering and ultraviolet light so as to provide a long, useful life for the composite article should it be intended to be affixed to a vehicle and used as a roofing material. The term "heat bondable" as used herein is intended to denote those plastic films which are capable of being melted and permanently bonded to another plastic film by the application of heat. Representative plastic film materials include the vinyl and vinylidene, acrylic, urethane, polyester, fluorocarbon, and polyolefin polymers and compatible blends thereof. Vinyl chloride polymers are economically preferred. Preferred vinyl chloride polymers may be any of the conventional polyvinyl chloride resins that have been hitherto used in such applications in formulation with any desired and suitable plasticizers, fillers, stabilizers, pigments, fungicides, process aids, and the like. If desired, internally plasticized vinyl chloride polymers may be used instead of the combination of conventional vinyl chloride polymers and external plasticizers. The thickness of this plastic film will generally range from about 5 mils (0.13 mm.) to about 25 mils (0.7 mm.) although thinner as well as thicker films can be used, if desired. The film can be formed by any fabrication technique known to the art and is generally embossed with a suitable decorative pattern. It may be covered with a thin protective polymeric topcoat (not shown), such as a urethane, acrylic or vinyl polymer or compatible blends thereof, to protect it from degradation due to mechanical, chemical and environmental factors.

The film 1 is attached to a backing which is broadly indicated by reference numeral 2 in the Figures. The attachment of backing 2 to film 1 can be made by means of a thin adhesive layer, as previously mentioned, or the film 1 can be directly attached to the backing 2 (e.g., by extrusion or calendering of hot plastic film 1 onto the backing 2) so that the attachment is made without the need for an intermediate adhesive layer.

The backing 2 can be selected from a wide variety of backing materials, such as non-woven, woven, knit, or composite materials (non-woven/foam combinations, non-woven/knit combinations, non-woven/woven/k- nit combinations, etc.) to provide a sufficiently thick layer which will aid in camouflaging any surface irregularities that may exist on the substrate, e.g., vehicle roof, when the composite article is in position on the substrate. The term "backing" as used herein is to be construed as relating to such backing materials which are well known in the art of making film/backing composite articles which are useful, for example, as exterior roofing materials for vehicles. Generally, the weight of the backing material will range from about 2 to about 20 oz/yd$^2$ (68–680 gm./m$^2$) and its density from about 2 to about 20 lbs/ft$^3$ (32–320 kg/m$^3$). The thickness of the backing and film composite will generally range from about 20 to about 200 mils (0.5–5.1 mm.), preferably from about 55 mils (1.4 mm.) to about 85 mils (2.2 mm.).

A preferred backing material for reasons of improved tailorability of the finished product are the commercially available backings of a non-woven fabric of synthetic fibers which have been needle punched into a thin layer of foam. Some preferred examples of fibers which can be used in such a backing include: polypropylene, rayon, polyester, acrylonitrile, nylon, polyphenylene sulfide, and mixtures thereof. Suitable foam materials which can be used include urethane and polyvinyl chloride foams. The denier of such fibers in this type of backing can range from about 1 to about 20. "Denier" is defined as unit of fineness equal to the fineness of a yarn weighing one gram for each 9000 meters. The foam in such a backing can have a thickness of from about 10 mils (0.25 mm.) to about 150 mils (2.5 mm.)

The backing 2 is preferably made water repellent by treatment with an effective amount of at least one water repellent agent when the composite article of the present invention is to have an exterior use, e.g., as a vehicle roof material. Fluorocarbon emulsions, which are available under the trademarks "Zepel" (from E. I. DuPont de Nemours Co.) or "Scotchguard" (from 3 M Co.) are representative types of materials which can be used to confer such water repellency. In order to treat the selected type of backing material, it can, for example, be placed in a fluorocarbon bath, dried, and the resulting product can be cured. The product that results from either this or alternative treating procedures will resist being wetted by water, oil and other contaminants. Further information on how backing 2 might be rendered water repellent can be ascertained from "Waterproofing and Water Repellency", Kirk-Othmer Encyclopedia of Chemical Technology, 2nd Edition, Vol. 2, pp. 135–156 (1970).

If desired, one or more corrosion inhibitors can be used to treat the backing 2 in order to confer or enhance corrosion protection on the article/substrate combination. The corrosion inhibitor can be any compatible inhibitor and can be applied in conjunction with the aforementioned water repellent agent. For example, when a fluorocarbon bath treatment is employed, such know corrosion inhibitors as the nitrites, phosphates, chromates, and sulfates might be present in the bath to act as a corrosion inhibitor when the article is subjected to exterior use for the final article/substrate combination that will be produced. One corrosion inhibitor which is preferred for economic reasons is sodium nitrite. Further information on how the backing 2 might be treated to render the article/substrate combination corrosion resistant can be ascertained from "Corrosion Inhibitors", Kirk-Othmer Encyclopedia of Chemical Technology, 2nd Edition, Vol. 6, pp. 317–346 (1965).

The composite article of film 1 and backing 2 which is known to the prior art can be formed by a number of well-known processes such as direct calender lamination or extrusion coating, post lamination or casting.

Direct calender lamination or extrusion coating produce a composite article without the use of an intermediate adhesive layer. The plastic film 1 acts as the adhesive because it is brought in contact with the backing 2 shortly after formation while the film 1 is still hot and sticky.

Post lamination is another well known method and differs from the extrusion coating or direct calender lamination techniques in that the plastic film 1 is not usually formed just prior to the bonding step and an intermediate adhesive layer is applied directly by known coating techniques (gravure cylinder, knife, roller, reverse roller, etc.) to the film before the film is contacted with the backing 2. A roll of preformed film is generally the source of the film, and a thin layer of adhesive is applied to the side of the film which is to be bonded to the backing. The adhesive is applied by a suitable means usually in an amount in the range of from about 1 to about 5 oz./yd.$^2$ (34 to 170 g/m$^2$) depending upon the adhesive. The coated film is then contacted with the backing to form the composite article known to the prior art.

Adhesives suitable for use in the post lamination technique are well known in the art. Some examples include plastisol, epoxy, acrylic, and urethane adhesives. Plastisols are one of the best known materials. These are dispersions of finely divided polymeric materials in nonvolatile organic liquids and low melting solids, generally referred to as plasticizers. Suitable plasticizers include phthalate, adipate and sebaccate esters and polyols such as ethylene glycol and its derivatives. A typical plastisol composition is 50 parts polymeric material and 50 parts plasticizer, forming a paste which gels, and fuses when heated to about 300° F. as a result of solvation of the resin particles by the plasticizer. If a volatile solvent is included in the plastisol, then the adhesive generally is referred to as an organosol which also is suitable for use in the invention.

In order to form the final pressure sensitive, composite article of the present invention, the exposed side of backing 2 is coated with a substantially continuous layer 4 of a suitable tacky, pressure sensitive adhesive and a polymeric release liner 5 which has a melting point below the heat deformation temperature of the plastic film 1. Pressure sensitive adhesives are a well known class of adhesives and develop maximum adhesive bonding with the application of pressure alone. Preferred adhesives of this class are those which exhibit good adhesion and, when the article is to be used in exterior applications, outdoor durability. Self crosslinking thermosetting acrylic pressure sensitive adhesives are one preferred class which can be used in the forming of the laminate of the present invention. Illustrative U.S. patents describing adhesives of this type are U.S. Pat. Nos. 3,269,994, 3,579,490 and 4,005,247. Preferred formulations are available under the trademarks "Aeroset 1085" (Ashland Chemical Company), "Bostick 7525" (USM Corp.) and "DC-7025" (Daubert Chemical Co.). These adhesives have, moreover, shown to have especially good compatibility to backings containing the water repellent and/or corrosion inhibitor agents described above. The thickness of the adhesive layer in the composite article of the present invention can range from about 0.5 mil (0.01 mm.) to about 10 mils (0.25 mm.). The layer is deposited on backing 2 so that it forms a substantially continuous coating which is also substantially free of voids, channels and the like. The presence of such a layer affords a barrier between the substrate and the atmosphere to moisture and other environmental factors which are prone to cause corrosion when the article is used in exterior applications in the substrate/article combination.

The release liner 5 is a polymeric material which melts below the permanent deformation temperature of the plastic film 1. It will generally have a thickness of from about 0.5 mil (0.0125 mm.) to about 10 mils (0.25 mm.) in the laminate of the present invention. Examples of such release liners include polyolefinic (e.g., ethylene) polymers, ethylene/vinyl acetate copolymer, ethylene/acrylic copolymer, and ethylene/chlorinated polyethylene blends which may be suitably release coated, e.g., with a silicone release agent. In selecting the appropriate polymeric material for use in the release liner, it is essential that the melting point of the material for the liner be lower than the heat deformation temperature of the plastic film 1 so as to avoid undesired deformation of that film, e.g., of the decorative grain normally embossed on the top surface of film 1. If vinyl chloride polymers are used in film 1, the melting point of the release liner 5 should be no higher than about 188° F. (86.7° C.) One preferred polymeric material for use as the release liner is a low density polyethylene/ethylene-vinyl acetate blend having these melting characteristics.

FIG. Nos. 1–4 show how the composite article of the present invention may be used to form a larger unitary article which can be bonded to the exterior surface of the roof of a motor vehicle.

FIG. 1 shows that two pieces of the composite article of the present invention are placed together with their respective plastic films 1 touching and facing one another. These two pieces are then stitched together along line A at a sufficient distance from their edge, for example, about one-half inch. Each portion is folded back in the direction indicated by the arrows so that the unitary article has the configuration depicted in FIG. 2.

Figure 2:
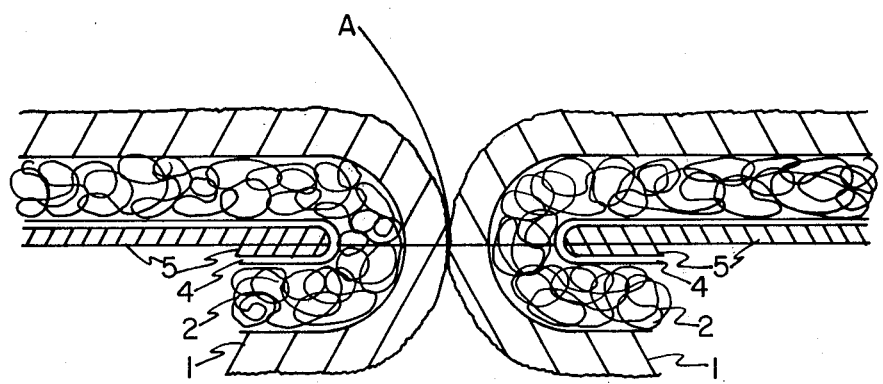
Figure 3:
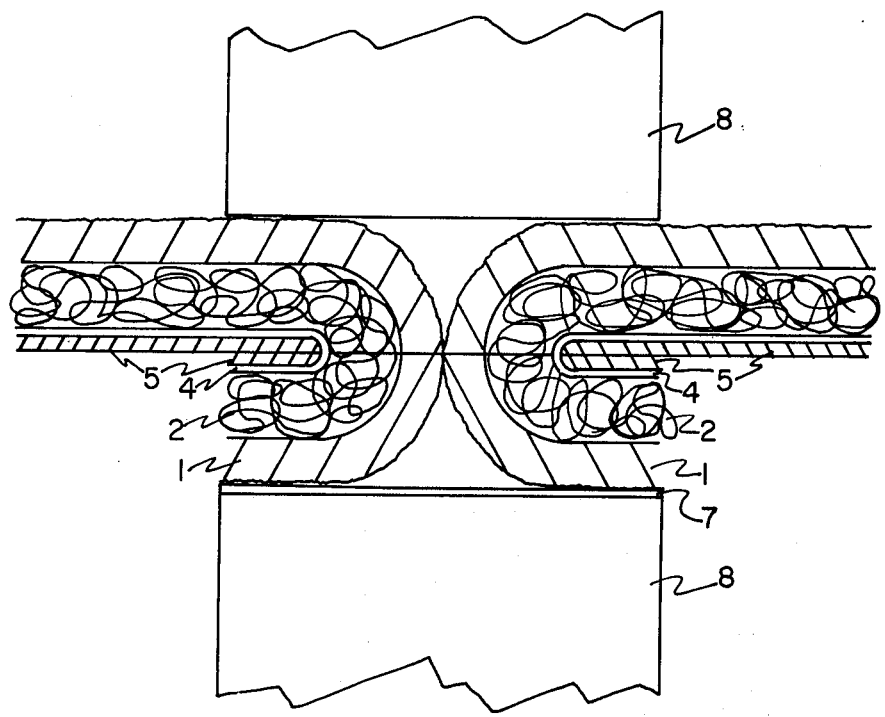
FIG. 3 shows the heat sealing operation wherein dielectric heat sealing means 8 is used to bond a portion of plastic film 1 to a sealing tape 7.
Figure 4:
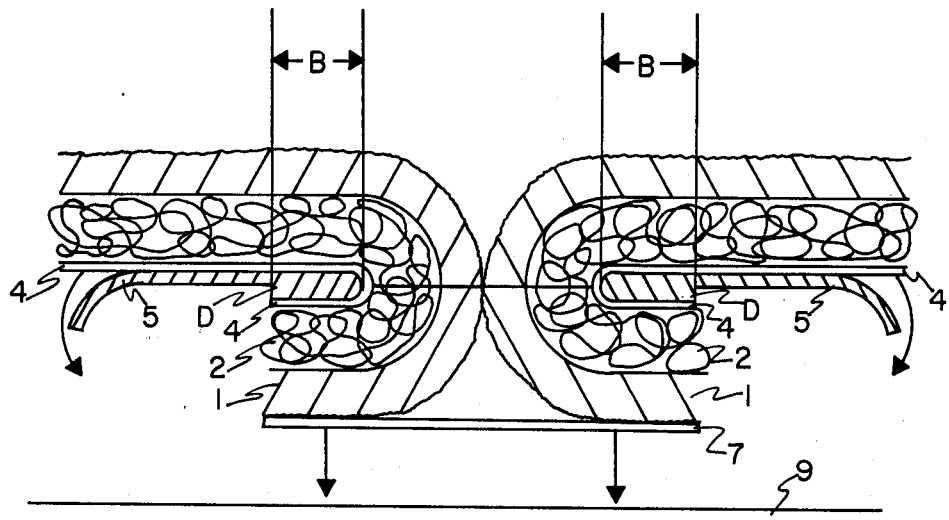
FIG. 4 shows the release paper 5 being removed from adhesive layer 4 so the unitary product formed from the two composite articles can be bonded to a suitable substrate 9, for example, the exterior roof of a motor vehicle.

The article depicted in FIG. 3 is then heat bonded to an appropriate sealing tape 7 (for example, a polyester sealing tape) at the small portion of the heat bondable plastic film 1 that originally lay adjacent the stitch line A, as depicted in FIG. 2. The heat sealing is preferably carried out using a dielectric sealing apparatus which generates sufficient heat to bond sealing tape 7 to plastic film 1 and to melt the adhesive 4 and release liner 5 which are in two facing layers in area B, as depicted in FIG. 4, so that they flow into the facing backing portions 2. Generally, temperatures of about 185°–210° F. (85°–98.9° C.) are sufficient to accomplish this result if a vinyl chloride polymer film is used. The presence of sealing tape 7 aids in the prevention of water seepage through the butt joint between the two original composite articles if the unitary article is employed in exterior uses, e.g., as the exterior roofing material for a motor vehicle.

FIG. 4 illustrates the removal of the remaining portions of release liner 5 to expose the pressure sensitive adhesive layer 4. In the removal operation release liner (5) separates from itself at point D where it is imbedded, along with adhesive (4), into backing (2) as a result of the dielectric sealing step. The unitary article can then be bonded to a desired substrate 9, e.g., the exterior roof of a motor vehicle, by use of pressure alone.

The Examples which follow illustrate some preferred embodiments of the present invention.

EXAMPLE 1

This Example illustrates how one preferred composite article in accordance with the present invention was made.

The first step in forming the desired product was calendering at a temperature of about 335° C. a film formulation containing the following ingredients to a thickness of about 14.5 mils (0.36 mm.):

| Ingredient | Percent by Weight |
| --- | --- |
| Polyvinyl chloride Homopolymer Resin | 47.745 |
| Calcium carbonate filler | 14.328 |
| Normal alkyl phthalate plasticizer | 31.194 |
| Fungicide/Plasticizer-Stabilizer | 1.197 |
| Epoxidized Soya Oil | 2.385 |
| Colloidal Silica | 0.477 |
| Heat stabilizer (Metallic soap) | 0.100 |
| Pigment | 1.197 |
| Liquid Phosphite Stabilizer | 0.477 |

To the calendered film was then applied via a roller knife technique, a polymeric solution topcoat at a rate of 0.105 lbs/yd$^2$ (0.57 kg/m$^2$). The volatile solvent in the topcoat solution was flashed off in a drying oven at a temperature of about 160° F. (71.1° C.) and recovered without release to the environment. The following ingredients formed the topcoat:

| Ingredient | Percent by Weight |
| --- | --- |
| Methyl ethyl ketone | 89.11 |
| PVC Homopolymer Resin | 7.61 |
| Acrylic Resin | 2.70 |
| Colloidal Silica | 0.58 |

The topcoated vinyl film was then laminated to a non-woven substrate with a plastisol adhesive and was in-line embossed with a decorative grain at a temperature of about 320° F. (160° C.) which also cured the plastisol adhesive. The non-woven substrate was an all-polyester blend of 60%, by weight, 3 denier, 4 inch (10.2 cm.) staple fibers; 20%, by weight, 6 denier, 3 inch (7.6 cm.) staple fibers; and 20%, by weight, 6 denier, 6 inch (15.2 cm.) staple fibers; which had been needle punched into a polyester urethane foam having a thickness of 30 miles (0.8 cm.) and a density of 2.0 lbs/ft$^3$ (32 kg/m$^3$). The composite non-woven/foam construction had been fluorocarbon treated. It is a commercially available product from Foss Manufacturing and had a weight of 6.5 oz/sq. yd. (0.22 kg/m$^2$). The 30 mils (0.8 cm.) of foam was primarily on the one side of the substrate, and it was this side which was laminated to the vinyl film.

The pressure sensitive adhesive formulation comprised these ingredients:

| Ingredients | Percent by Weight |
| --- | --- |
| Self-Crosslinkable Acrylic Pressure Sensitive Adhesive Solution ("Aroset 1085") | 77.77 |
| Ethyl acetate solvent | 16.67 |
| Toluene Solvent | 5.56 |

The composition was reverse roll coated at 0.3 lbs/yd$^2$ (0.16 kg/m$^2$) onto 94 lbs/ream (43 kg/ream), polyethylene coated, Kraft release paper from H. P. Smith, Inc. The solvent was flashed off in a drying oven at 150°–300° F. (65°–150° C.) and recovered. After drying, the release paper/adhesive composite was laminated to the non-woven side of the non-woven/vinyl film construction. In order to achieve the desired degree of penetration of the adhesive into the non-woven backing, the steel nip roll at the lamination station was heated to about 185° F. (85° C.) and placed against the release paper.

The release paper was removed from the article formed by the above procedure and was replaced with a polyolefinic release liner having a melting point of about 188° F. (86.7° C.)

EXAMPLE 2

The same procedure as used in Example 1 was employed to make a composite article using as the pressure sensitive adhesive a commercially available adhesive from Daubert Chemical Company ("DC-7025") which was used without dilution by addition of further solvent.

EXAMPLE 3

The same procedure as used in Example 1 was employed to make a composite article using as the pressure sensitive adhesive a commercially available adhesive from USM Corp. ("Bostik 7525") which was used without dilution by addition of further solvent.

The foregoing Examples illustrate preferred embodiment of the present invention which should not be construed in a limiting sense. The scope of protection that is sought is set forth in the claims which follow.

What is claimed:

1. A pressure sensitive, composite article which comprises:
   (a) a heat bondable plastic film;
   (b) a backing attached to the film on one side thereof;
   (c) a substantially continuous and uniform layer of a pressure sensitive adhesive bonded to the side of the backing which is opposite the plastic film; and
   (d) a polymeric release liner attached to the adhesive layer opposite the side of said layer which is bonded to the backing, the liner having a melting point which is below the temperature at which the plastic film is heat bondable.

2. A product as claimed in claim 1 wherein the film is a vinyl chloride polymer.

3. A product is claimed in claim 1 wherein the film has a thickness of from about 5 mils to 25 mils.

4. A product as claimed in claim 1 wherein the film is attached to the backing by a layer of adhesive.

5. A product as claimed in claim 4 wherein the adhesive is a plastisol adhesive.

6. A product as claimed in claim 1 wherein the backing is a non-woven fabric.

7. A product as claimed in claim 6 wherein the non-woven fabric also comprises a foam layer.

8. A product as claimed in claim 1 wherein the weight of the backing ranges from about 2 to about 20 oz/yd$^2$.

9. A product as claimed in claim 1 wherein the density of the backing ranges from about 2 to about 20 lbs/ft$^3$.

10. A product as claimed in claim 1 wherein the pressure sensitive adhesive is an acrylic pressure sensitive adhesive.

11. A product as claimed in claim 1 wherein the adhesive layer has a thickness of from about 0.5 mil to about 10 mils.

12. A product as claimed in claim 1 wherein the backing has a weight of from about 2 to about 20 oz/yd$^2$ and a density of from about 2 to about 20 lbs/ft$^3$.

13. A product as claimed in claim 1 wherein the backing has been treated with a compound selected from the group consisting of a water repellent agent and a corrosion inhibitor.

14. A product as claimed in claim 1 wherein the thickness of the film and backing ranges from about 20 to about 200 mils.

15. A product as claimed in claim 1 wherein the polymeric release liner is selected from the group consisting of a polyolefinic polymer, an ethylene/vinyl acetate copolymer, an ethylene/acrylic copolymer, a polyethylene/chlorinated polyethylene blend and a low density polyethylene/ethylene-vinyl acetate blend.

16. A product as claimed in claim 1 wherein the plastic film is a vinyl chloride polymer and the release liner has a melting point of no higher than about 188° F.

* * * * *

UNITED STATES PATENT AND TRADEMARK OFFICE
CERTIFICATE OF CORRECTION

PATENT NO. : 4,230,753

DATED : October 28, 1980

INVENTOR(S) : Gregory M. Sheyon

It is certified that error appears in the above-identified patent and that said Letters Patent are hereby corrected as shown below:

Col. 6, line 21, the stated "Percent by Weight" for the "Pigment" should be -- 0.900 --;

Col. 6, lines 21-22, the Table should also list -- Barium/Cadmium/Zinc Stabilizer -- as an additional ingredient at -- 1.197 -- percent by weight;

Col. 6, line 49, "miles" should be -- mils --; and

Col. 7, lines 21-22, the text should appear in regular style type rather than bold faced type.

Signed and Sealed this

Twenty-fourth Day of March 1981

[SEAL]

Attest:

RENE D. TEGTMEYER

Attesting Officer    Acting Commissioner of Patents and Trademarks